(12) United States Patent
Sunwoo et al.

(10) Patent No.: US 10,831,302 B2
(45) Date of Patent: Nov. 10, 2020

(54) DETACHABLE ELECTRONIC DEVICE AND OPERATING METHOD THEREOF

(71) Applicant: Samsung Electronics Co., Ltd., Suwon-si, Gyeonggi-do (KR)

(72) Inventors: Seunghui Sunwoo, Suwon-si (KR); Junyun Kim, Yongin-si (KR); Seongeun Kim, Hwaseong-si (KR); Jungsik Park, Suwon-si (KR); Heungsik Shin, Jeonju-si (KR); Seonil Kim, Gwacheon-si (KR); Jinwoo Kim, Seoul (KR); Hyunju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 14/931,186

(22) Filed: Nov. 3, 2015

(65) Prior Publication Data
US 2016/0124569 A1 May 5, 2016

(30) Foreign Application Priority Data

Nov. 5, 2014 (KR) ........................ 10-2014-0153105

(51) Int. Cl.
*G06F 3/041* (2006.01)
*G06F 9/445* (2018.01)
(Continued)

(52) U.S. Cl.
CPC .......... *G06F 3/0416* (2013.01); *G06F 3/1438* (2013.01); *G06F 9/44505* (2013.01);
(Continued)

(58) Field of Classification Search
CPC .. G06F 3/0416; G06F 3/1438; G06F 9/44505; G06F 3/1446; G06F 1/1647;
(Continued)

(56) References Cited

U.S. PATENT DOCUMENTS 8,836,713 B2 *  9/2014  Caskey ................ G06F 3/1446
                                                      345/1.1
2004/0119660 A1   6/2004  Okuley et al.
(Continued)

FOREIGN PATENT DOCUMENTS

EP        2698968 A1      2/2014
JP        2012-143012 A   7/2012
KR        10-2008-0000803 A  1/2008

OTHER PUBLICATIONS

European Office Action dated May 31, 2019, issued in European Application No. 15193002.1.
(Continued)

*Primary Examiner* — Patrick N Edouard
*Assistant Examiner* — Joseph P Fox
(74) *Attorney, Agent, or Firm* — Jefferson IP Law, LLP

(57) ABSTRACT

A device and a method are provided. The device and the method include providing, by a first electronic device, first content associated with an application that is executed in a second electronic device detachably connected to the first electronic device, determining a change in a connection between the first and second electronic devices based on an event that occurs in the connection, and providing, by the first electronic device, the first content, or second content associated with the application based on the determination of the change in the connection.

18 Claims, 8 Drawing Sheets

(51) Int. Cl.
*H04M 1/725* (2006.01)
*G06F 3/14* (2006.01)
*H04M 1/02* (2006.01)

(52) U.S. Cl.
CPC ..... *H04M 1/7253* (2013.01); *H04M 1/72527* (2013.01); *G06F 3/1446* (2013.01); *G09G 2360/02* (2013.01); *G09G 2370/04* (2013.01); *G09G 2370/16* (2013.01); *G09G 2380/08* (2013.01); *H04M 1/0256* (2013.01)

(58) Field of Classification Search
CPC ............. G06F 3/1454; H04M 1/7253; H04M 1/72527; H04M 1/0256; G09G 2370/04; G09G 2360/02; G09G 2370/16; G09G 2380/08
See application file for complete search history.

(56) References Cited

U.S. PATENT DOCUMENTS

| | | | | |
|---|---|---|---|---|
| 2006/0160567 A1* | 7/2006 | Parivash | ............... | G06F 1/1632 455/556.2 |
| 2007/0004450 A1* | 1/2007 | Parikh | ................... | G06F 1/1626 455/556.1 |
| 2008/0028118 A1* | 1/2008 | Sayers | .................. | G06F 1/1632 710/303 |
| 2010/0081473 A1* | 4/2010 | Chatterjee | ............. | G06F 1/1632 455/559 |
| 2010/0227642 A1* | 9/2010 | Kim | .................... | H04M 1/0256 455/556.1 |
| 2011/0185048 A1* | 7/2011 | Yew | .................. | H04M 1/72527 709/221 |
| 2011/0275332 A1* | 11/2011 | Rofougaran | .......... | G06F 1/3203 455/73 |
| 2012/0235638 A1* | 9/2012 | Pijnenburg | .............. | H02J 7/022 320/108 |
| 2012/0252230 A1* | 10/2012 | Alameh | ............... | H04M 1/0256 439/31 |
| 2013/0057077 A1* | 3/2013 | Rothschild | .............. | H02J 7/025 307/104 |
| 2013/0121502 A1 | 5/2013 | Fujii et al. | | |
| 2013/0172055 A1 | 7/2013 | Han | | |
| 2014/0035851 A1* | 2/2014 | Kim | ........................ | G06F 3/041 345/173 |
| 2014/0092047 A1 | 4/2014 | Nara et al. | | |
| 2014/0189395 A1* | 7/2014 | Kp | ........................ | G06F 1/3231 713/320 |
| 2014/0218266 A1* | 8/2014 | Chen | ..................... | G06F 3/1446 345/1.3 |
| 2014/0320381 A1 | 10/2014 | Enzmann et al. | | |
| 2014/0354223 A1* | 12/2014 | Lee | ......................... | H02J 5/005 320/108 |
| 2016/0147292 A1* | 5/2016 | Sunwoo | ................ | G06F 1/1647 713/323 |

OTHER PUBLICATIONS

Chinese Office Action dated Aug. 2, 2019, issued in Chinese Application No. 201510747011.0.
European Office Action dated Sep. 25, 2018, issued in European Application No. 15193002.1.

* cited by examiner

DETACHABLE ELECTRONIC DEVICE AND OPERATING METHOD THEREOF

CROSS-REFERENCE TO RELATED APPLICATION(S)

This application claims the benefit under 35 U.S.C. § 119(a) of a Korean patent application filed on Nov. 5, 2014 in the Korean Intellectual Property Office and assigned Serial number 10-2014-0153105, the entire disclosure of which is hereby incorporated by reference.

TECHNICAL FIELD

The present disclosure relates to a detachable electronic device and an operating method thereof.

BACKGROUND

Electronic devices can provide a variety of services, and portable electronic devices, such as, for example, smart phones or tablet computers, afford much more convenience to users while implementing advanced capabilities. Electronic devices provide various user interfaces to input and output information associated with functions or programs that can be executed therein.

Various user interfaces may exist because there may be input and output methods suitable for functions, types, usage environments, or the like of electronic devices. For example, electronic devices may include a plurality of parts that can be coupled to and separated from each other, and may provide user interfaces with improved user convenience based on parts that can be coupled to and separated from each other. In addition, the electronic devices may provide various user interfaces and services to users through a combination with other electronic devices.

The above information is presented as background information only to assist with an understanding of the present disclosure. No determination has been made, and no assertion is made, as to whether any of the above might be applicable as prior art with regard to the present disclosure.

SUMMARY

An electronic device may include a plurality of displays that can be separated therefrom. When some of the plurality of displays are separated from the electronic device, information may not be properly displayed through the separated displays. For example, due to an interruption of data transmission or a change of a data transmission method, information displayed on the displays before the separation may not be displayed any more, or a user may be inconvenienced by an unintended change of a screen. In addition, due to mounting or detaching a plurality of electronic devices, when functions or applications suitable for separated devices are not automatically provided, users may be aggravated due to the attachment or detachment between electronic devices.

Aspects of the present disclosure are to address at least the above-mentioned problems and/or disadvantages and to provide at least the advantages described below. Accordingly, an aspect of the present disclosure is to provide a method and device that can maintain a screen that is being displayed, or can change a service that is being performed based on mounting or detachment of an electronic device. Furthermore, various embodiments of the present disclosure may provide a method and device that can manage internal/external interfaces and power of an electronic device by previously determining that the electronic device is to be mounted or detached.

In accordance with an aspect of the present disclosure, a method is provided. The method includes providing, by a first electronic device, first content associated with an application that is executed in a second electronic device detachably connected to the first electronic device, determining a change in a connection between the first and second electronic devices based on an event that occurs in the connection, and providing, by the first electronic device, the first content, or second content associated with the application based on the determination of the change in the connection.

In accordance with another aspect of the present disclosure, a first electronic device is provided. The first electronic device includes a connector detachably connected to a second electronic device, and at least one processor configured to execute one or more modules, wherein the one or more modules comprises a determination module configured to determine a change in a connection between the first and second electronic devices based on an event that occurs in the connection, and a provision module configured to provide first content associated with an application that is executed in the second electronic device detachably connected to the first electronic device and provide the first content or second content associated with the application based on the determination of the change in the connection.

The electronic device and method, according to the various embodiments of the present disclosure, can selectively provide various types of content as the electronic device is coupled to or separated from another electronic device. In addition, the electronic device and method, according to the various embodiments of the present disclosure, can previously recognize the coupling or separation of another electronic device and manage resources (e.g., a processor, an interface, power, etc.) of the electronic device, thereby increasing usable time of the electronic device and data stability.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
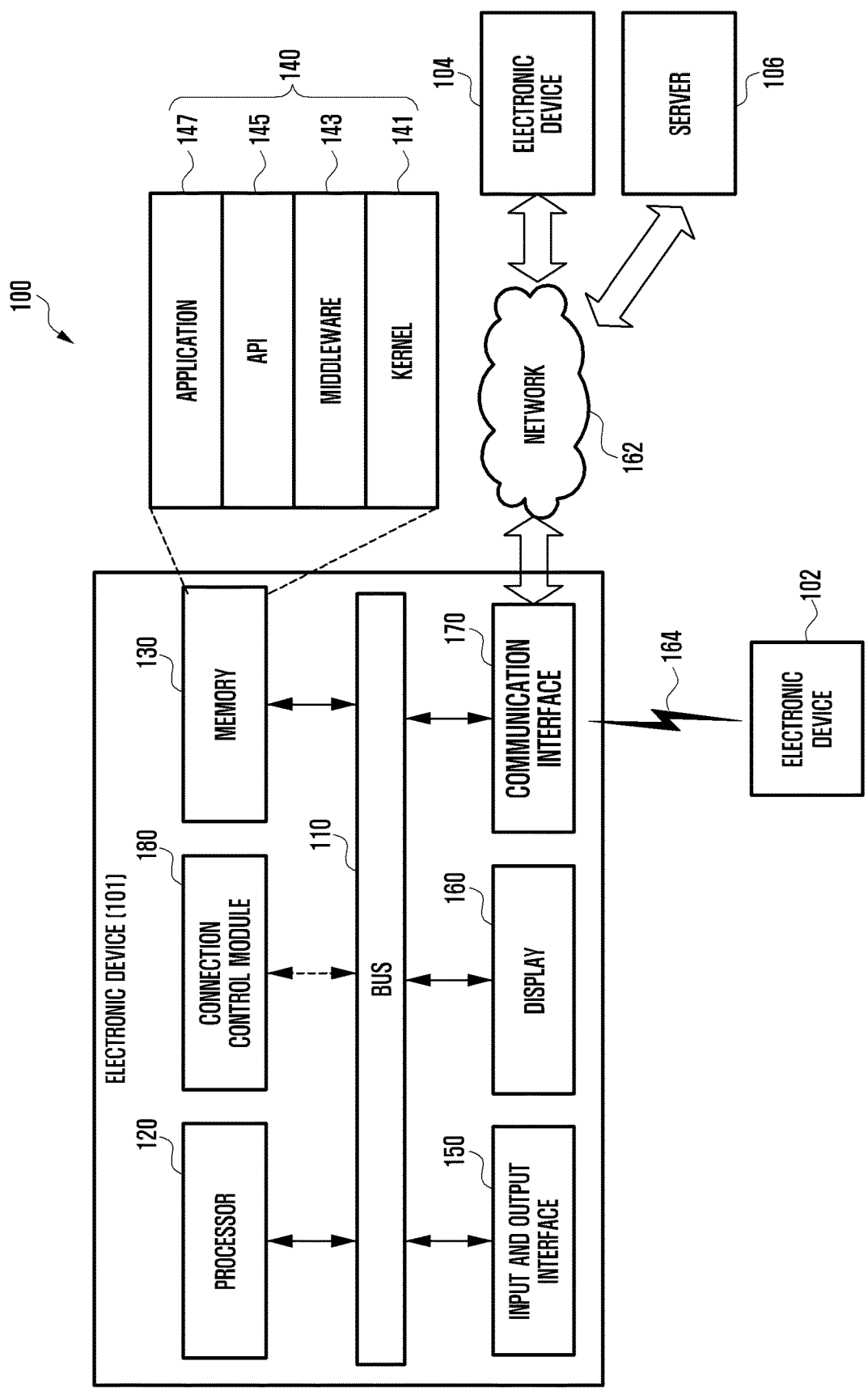
FIG. 1 illustrates a network environment including an electronic device, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments of the present disclosure, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude various embodiments of the present disclosure.

In this present disclosure, an electronic device may include a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, an electronic appcessory, an electronic tattoo, a smart mirror, or a smart watch).

According to various embodiments of the present disclosure, an electronic device may be a smart home appliance that involves a communication function. For example, an electronic device may be a television (TV), a digital versatile disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight DR (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.).

According to various embodiments of the present disclosure, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 is a block diagram illustrating a network environment including therein an electronic device according to an embodiment of the present disclosure.

Referring to FIG. 1, a network environment 100 may include an electronic device 101 to perform communications. The electronic device 101 may include, but not limited to, a bus 110, a processor 120, a memory 130, an input/output interface 150, a display 160, a communication interface 170, and a connection control module 180.

In various embodiments of the present disclosure, at least one of the elements of the electronic device 101 may be omitted or other elements may be additionally included in the electronic device 101.

The bus 110 may include, for example, a circuit which interconnects the elements 110 to 180 and provides communication (e.g., a control message and/or data) between the elements 110 to 180.

The processor 120 may include one or more of a CPU, an AP, and a communication processor (CP). The processor 120, for example, may carry out operations or data processing relating to control and/or communication of at least one element of the electronic device 101.

The memory 130 may include a volatile memory and/or a non-volatile memory. The memory 130 may store, for example, instructions or data relevant to at least one element of the electronic device 101. According to an embodiment of the present disclosure, the memory 130 may store software and/or a program 140. The program 140 may include, for example, a kernel 141, middleware 143, an application programming interface (API) 145, and/or applications 147. At least some of the kernel 141, the middleware 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 may perform intermediation by which the API 145 or the applications 147 communicates with the kernel 141 to transmit or receive data. In addition, the middleware 143 may process one or more task requests received from the applications 147 according to priorities thereof. For example, the middleware 143 may assign a priority, which enables the use of system resources (e.g., the bus 110, the processor 120, the memory 130, etc.) of the electronic device 101, to at least one of the applications 147. For example, the middleware 143 may perform scheduling or loading balancing on the one or more task requests by processing the one or more task requests according to the priorities assigned thereto.

The API 145 is an interface for allowing the applications 147 to control a function provided by the kernel 141 or the middleware 143 and may include, for example, at least one interface or function (e.g., a command) for file control, window control, image processing, text control, and the like.

The input/output interface 150, for example, may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a light emitting diode (LED) display, an organic LED (OLED) display, a micro electro mechanical system (MEMS) display, or an electronic paper display. For example, the display 160 may display various pieces of content (e.g., text, images, videos, icons, symbols, etc.) to the user. The display 160 may include a touch screen, and for example, receive a touch, gesture, proximity, or hovering input using an electronic pen or a body part of a user.

The communication interface 170, for example, may enable communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, wireless fidelity (WiFi), Bluetooth® (BT), near field communication (NFC), and GPS. The wired communication may include at least one of, for example, a universal serial bus (USB), a high definition multimedia interface (HDMI), recommended standard 232 (RS-232), and a plain old telephone service (POTS). The network 162 may include at least one of communication networks, such as a computer network (e.g., a local area network (LAN), or a wide area network (WAN)), the Internet, and a telephone network.

The connection control module 180 may control some functions of the electronic device 101, for example, by using the processor 120 or independently of the processor 120 such that the electronic device 101 interworks with another electronic device. The other electronic device may be, for example, the first external electronic device 102, the second external electronic device 104, or the server 106. In addition, for example, the other electronic device may include a processor and a display that operate independently of the processor 120 of the electronic device 101, and may be a peripheral device or accessory that can be attached to or detached from the electronic device 101. The other electronic device may be a part of the electronic device 101 that can be detached from the electronic device 101.

According to an embodiment of the present disclosure, the connection control module 180 may selectively provide content when it is determined that there will be a change in the connection state between the electronic device 101 and the other electronic device. The connection control module 180 may change a supply source of content provided through the electronic device 101, for example, in response to the attachment or detachment between the electronic device 101 and the other electronic device. According to an embodiment of the present disclosure, the connection control module 180 may perform a control associated with the electric power of the electronic device 101 or the other electronic device in response to the attachment or detachment.

Although the connection control module 180 is illustrated to be independent of the processor 120 and the memory 130 in FIG. 1, various embodiments of the present disclosure are not limited thereto. At least a part of the connection control module 180, for example, may be integrated with the processor 120, or may be executed in the processor 120 while being stored in a software form in the memory 130. Further, at least a part of the connection control module 180, for example, may be distributed in the processor 120 and the memory 130. Alternatively, other various embodiments of the present disclosure can be made.

Each of the first and second external electronic devices 102 and 104 may be identical to or different from that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request to perform at least some functions relating thereto to another device (e.g., the electronic device 102 or 104 or the server 106) instead of performing the functions or services by itself or additionally. The other electronic device (e.g., the electronic device 102 or 104 or the server 106) may carry out the requested functions or the additional functions and transfer the result to the electronic device 101. The electronic device 101 may process the received result as it is or additionally to provide the requested functions or services. To achieve this, for example, cloud computing, distributed computing, or client-server computing technology may be used.

Figure 2:
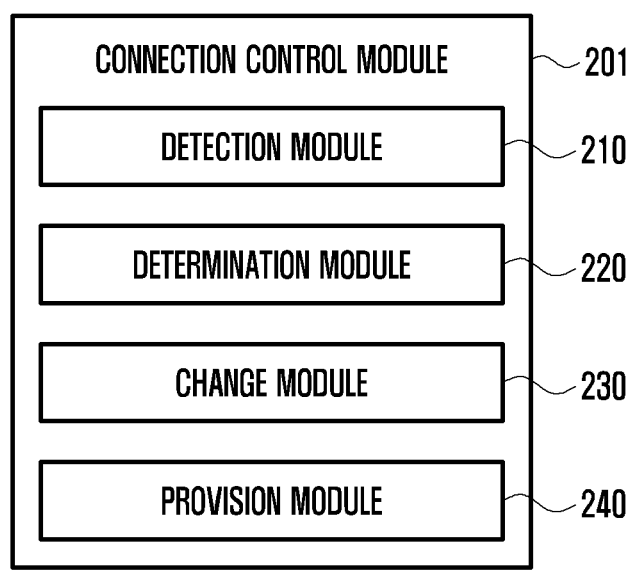
FIG. 2 is a block diagram of a connection control module of an electronic device, according to various embodiments of the present disclosure.

FIG. 2 is a block diagram of a connection control module of an electronic device according to various embodiments of the present disclosure.

Referring to FIG. 2, a connection control module 201 may be an implementation of the connection control module 180 for use in an electronic device 101. The connection control module 201 may include a detection module 210, a determination module 220, a change module 230, and a provision module 240. Herein, an embodiment of the present disclosure in which the connection control module is distinguished into specific modules is described for convenience of description. However, various embodiments of the present disclosure are not limited thereto and may include various hardware/software structures that can realize substantially similar operations. For example, at least some of the modules according to this embodiment of the present disclosure may be omitted, or a specific module may also perform the function of another module instead.

The detection module 210 may acquire, for example, information associated with a physical connection with an external device (e.g., the first or second external electronic device 102 or 104). According to an embodiment of the present disclosure, when the electronic device is physically or electrically coupled to or separated from the external device, the detection module 210 may detect a change in a signal generated by the electronic device or a connector of the external device. For example, the detection module 210 may detect an analog or digital signal generated by a part of the connector. The connector may include, for example, a contact terminal, a magnet, a pin, a locking device, or the like. For example, the detection module may detect a signal generated when at least one of a plurality of contact terminals (or contact points) is separated from the corresponding contact terminal of the external device. According to an embodiment of the present disclosure, the detection module 210 may detect a change in a signal generated from a sensor (e.g., a touch sensor) that is formed on at least a part of a housing or screen of the electronic device.

The determination module 220 may determine that there will be a change in a connection state between the electronic device and the external device, for example, based on an event occurring in at least one of the electronic device and the external device. According to an embodiment of the present disclosure, based on information received from the detection module 210, the determination module 220 may determine that the electronic device is to be detached from the external device, or may determine that the electronic device is to be mounted on the external device.

According to an embodiment of the present disclosure, when a change of signal that is generated by a contact point of the electronic device satisfies a specified condition while the electronic device is mounted on the external device, the determination module 220 may determine that the electronic device is to be detached from the external device. The specified condition may include, for example, the order, amount, difference, or interval of the signal change. Additional information associated with the determination of detachment on the basis of the signal change that has occurred in regard to the plurality of contact points of the electronic device 200 is provided below in connection with FIG. 3B.

According to an embodiment of the present disclosure, when a user's grip satisfies a specified condition while the electronic device is mounted on the external device, the determination module 220 may determine that the electronic device is to be detached from the external device, or may determine that the electronic device is to be mounted on the external device. The specified condition may include, for example, the order, area, pressure, or interval of grips recognized by the electronic device and the external device. Information associated with the grip may be detected, for example, through a touch sensor (e.g., a touch panel). According to an embodiment of the present disclosure, when a grip recognized by the external device satisfies a specified condition while the external device is mounted on the electronic device, the external device may transfer information associated with the recognized grip to the electronic device.

For example, when one hand of a user is detected in a specified area of the touch sensor of the electronic device, and the other hand of the user is detected in the specified area of the touch sensor of the external device within a specified time (e.g., five seconds), the determination module 220 may determine that the electronic device is to be detached from the external device. In addition, for example, when at least one hand of a user is detected in the specified area of the touch sensor of the electronic device, and the electronic device is within a specified distance (e.g., about 10 cm) from the external device, the determination module 220 may determine that the electronic device is to be mounted on the external device. The distance from the external device may be determined, for example, based on a quality (e.g., intensity) of a signal received from the external device.

According to an embodiment of the present disclosure, a change in the connection state between the electronic device and the external device may be determined based on the type of an application executed in the electronic device or the external device. For example, when user authentication is performed through the electronic device while a payment application is being executed in the external device, the determination module 220 may predict that the electronic device is to be detached from the external device. According to an embodiment of the present disclosure, the determination module 220 may represent (e.g., display) that a service associated with the detachment can be performed. According to an embodiment of the present disclosure, a change in the connection state between the electronic device and the external device may also be determined based on an access point where the two devices are connected to each other, the locations of the two devices, a received message, or the like.

According to an embodiment of the present disclosure, the determination module 220 may use information that is received from the external device as at least a part of the event. For example, while the external device is mounted on the electronic device, when a change of signals generated from at least some of the contact points of the external device satisfies a specified condition, the external device may transmit information to the electronic device. The electronic device may determine (recognize) that the electronic device is already detached from the external device by using the received information. According to an embodiment of the present disclosure, the external device may determine (predict) that the electronic device and the external device are to be physically or electrically separated from each other, and may transfer information containing the determination result to the electronic device.

According to an embodiment of the present disclosure, before a specified time passes from when it is determined that there will be a change in the connection state between the electronic device and the external device, the determination module 220 may identify whether the change (e.g., detachment or mounting) occurs. Herein, for convenience of description, the time point of the determination is referred to as a prediction time point, and the information containing the determination result is referred to as prediction information. According to an embodiment of the present disclosure, when a signal to indicate detachment is received from the detection module 210 (or connector) within a specified time (e.g., three seconds) from the prediction time point, the determination module 220 may identify that the electronic device has been detached from the external device. For example, the specified time may vary according to the type of an application executed in the electronic device or the external device. In addition, for example, the specified time may also vary according to the order, area, pressure, or interval of grips detected by the electronic device or the external device. According to an embodiment of the present disclosure, the specified time may also be set to a different time according to the connection structure of the electronic device and the external device. For example, when there is an additional locking structure for assisting the physical coupling between the electronic device and the external device, the specified time may be set based on time (e.g., 20 seconds) for an operation of the locking structure.

According to an embodiment of the present disclosure, if a signal to indicate detachment is not received from the detection module 210 within a specified time from the prediction time point, the determination module 220 may determine that the physical coupling between the electronic device and the external device is maintained. For example, if the electronic device is not detached from the external device within a specified time from the prediction time point, the determination module 220 may stop identifying the change.

The change module 230 may control a processor, power, or communication of the electronic device when it is determined that the electronic device is to be mounted on the external device, or is to be detached from the external device. According to an embodiment of the present disclosure, the change module 230 may change at least one processor included in the electronic device to an activated state or a deactivated state. For example, when the change module 230 determines that there will be a change in the connection state between the electronic device and the external device, the change module may change a processor (e.g., an AP) that is external to the connection control module 201 from a deactivated state to an activated state. The deactivated state may include, for example, a power off state or a power saving mode (e.g., a sleep mode).

For example, when the determination module 220 determines that there will be a change in the connection state between the electronic device and the external device, the change module 230 may allow at least some elements of the electronic device to receive power from a power supply source (e.g., a battery) included in the electronic device. For example, when it is recognized that the electronic device is already detached from the external device, or when it is predicted that the electronic device is to be detached from the external device, the change module 230 may change the power supply source from an external supply source to an internal supply source. According to an embodiment of the present disclosure, when it is recognized that the electronic device is already detached from the external device, or when it is predicted that the electronic device is to be detached from the external device, the change module 230 may also change the power supply source from an internal supply source to an external supply source.

According to an embodiment of the present disclosure, when it is recognized that the electronic device is already detached from the external device, or it is predicted that the electronic device is to be detached from the external device, and the residual power of the power supply source included in the electronic device is lower than or equal to a specified reference (e.g., about 30% of a battery capacity), the change module 230 may change the operating mode of the electronic device to a low-power mode. The low-power mode may include, for example, a change of display setting (e.g., color, brightness, etc.), a change of a processor operating frequency, a change of a communication means, termination of a running application, or the like. According to an embodiment of the present disclosure, when it is recognized that the electronic device is already detached from the external device, or it is predicted that the electronic device is to be detached from the external device, and the residual power of the power supply source included in the electronic device is lower than or equal to a specified reference (e.g., about 30% of a battery capacity), the external device may wirelessly transfer power to the electronic device. In cases where the electronic device can wirelessly receive power from the external device, the electronic device may not change the operating mode thereof to the low-power mode.

According to an embodiment of the present disclosure, when it is recognized that the electronic device is already detached from the external device, or when it is predicted that the electronic device is to be detached from the external device, the change module 230 may activate a specific function, for example, a wireless charging function that corresponds the low-power mode of the electronic device. For example, when the residual power of the power supply source included in the electronic device is lower than or equal to a specified reference (e.g., about 50% of a battery capacity), the change module 230 may wirelessly receive power from the external device or another external wireless power supply source (e.g., a wireless charging pad).

The provision module 240, for example, may display data received from the external device through an output device (e.g., the display 160) of the electronic device while mounted on the external device. According to an embodiment of the present disclosure, the received data may also be directly transferred to the output device without the provision module 240.

According to an embodiment of the present disclosure, the provision module 240 may store data received from the external device in a memory (e.g., the memory 130). For example, when the electronic device is predicted to be detached from the external device, the provision module 240 may display a screen using the data stored in the memory and then may stop receiving data from the external device. According to an embodiment of the present disclosure, the provision module 240 may output the data stored in the memory for a specified time, and may output, for example, data received from a server through a communication interface (e.g., the communication interface 170) after the specified time.

For example, when it is determined that the electronic device is already detached from the external device, or when it is predicted that the electronic device is to be detached from the external device, the provision module 240 may execute a specified application. For example, in regard to an application executed in the external device, the provision module 240 may provide content provided before the prediction, or another piece of content associated with the application. According to an embodiment of the present disclosure, the provision module 240 may execute an application that can access and manipulate data received from the external device. For example, while the electronic device receives, from the external device, data associated with a telephone application executed in the external device and displays the received data through the display of the electronic device while mounted on the external device, when it is determined that the electronic device is already detached from the external device, or when the electronic device is estimated to be detached from the external device, the electronic device may execute a memo application to manipulate the data received from the external device in the electronic device.

In cases where the electronic device is spaced a specified distance or more from the external device, the provision module 240 may stop providing data through the electronic device. According to an embodiment of the present disclosure, while the electronic device is mounted on the external device, when a specified application is executed in the external device, and thereafter the electronic device is detached from the external device, the electronic device may allow an input/output device to be used within a specified distance range. For example, when the electronic device is spaced away from the external device by a specified distance (e.g., five meters) or more while performing a payment (e.g., financial payment) function, the electronic device may stop the payment function. According to an embodiment of the present disclosure, in cases where the electronic device is spaced away from the external device by a specified distance, the provision module 240 may change the electronic device to a locked state, or may deactivate (e.g., turn off) the screen of the electronic device.

According to an embodiment of the present disclosure, when a specified time passes after the electronic device is separated from the external device, the provision module 240 may change the electronic device to a locked state, or may deactivate (e.g., turn off) the screen. For example, while the electronic device is mounted on the external device, when a specified application is executed in the external device, and thereafter the electronic device is detached from the external device, the electronic device may provide the use of an input/output device for a specified time (e.g., about ten minutes). According to an embodiment of the present disclosure, in cases where an external processor (e.g., an AP) of the connection control module 201 is activated, the external processor may also perform at least some functions of the provision module 240, which are described above.

According to various embodiments of the present disclosure, the connection control module 201 may control the display, processor, or power supply of the electronic device without determining that the electronic device is to be detached from the external device. According to an embodiment of the present disclosure, the electronic device may include a switch that is implemented by hardware and may change data from an external supply source or a power supply path to a path from an internal supply source when the electronic device detects a change of signals through a connector while the electronic device is mounted on the external device. For example, when power supply from the external device is stopped, the switch may simultaneously or substantially simultaneously connect an internal power supply of the electronic device to other elements of the electronic device.

Figure 3A:
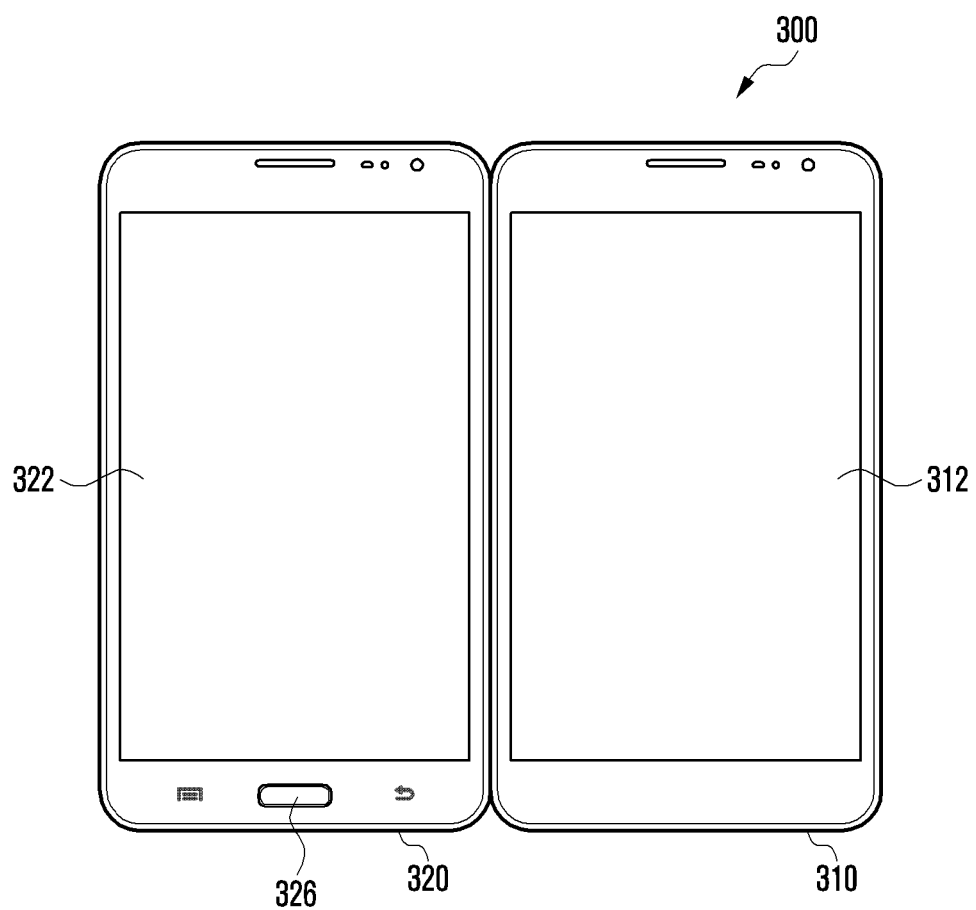
FIGS. 3A and 3B illustrate electronic devices functionally connected to each other according to various embodiments of the present disclosure.
Figure 3B:
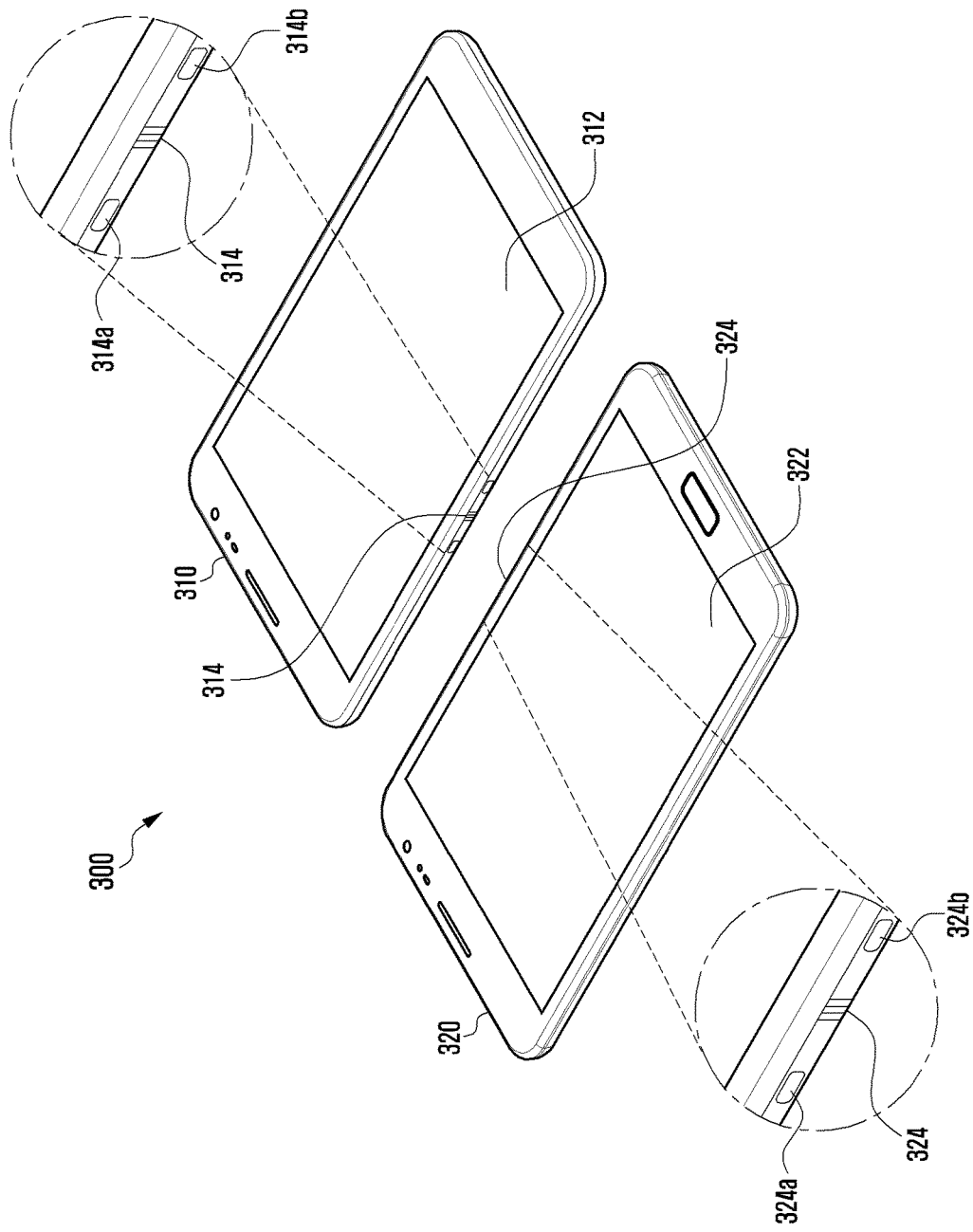

FIGS. 3A and 3B illustrate a plurality of electronic devices functionally connected to each other according to various embodiments of the present disclosure.

Referring to FIG. 3A, a plurality of electronic devices 300 may include a first electronic device 310 and a second electronic device 320. Each of the first and second electronic devices 310 and 320 may be, for example, the electronic device 101. According to an embodiment of the present disclosure, at least one of the first and second displays 312 and 322 may be excluded. According to an embodiment of the present disclosure, the first electronic device 310 may include at least a part of a case (e.g., a battery cover) of the second electronic device 320. According to an embodiment of the present disclosure, the plurality of electronic devices 300 may also be configured as a single electronic device that includes, for example, a first body part that corresponds to the first electronic device 310, the first display 312 functionally connected to the first electronic device 310, a second body part that corresponds to the second electronic device 320, and the second display 322 functionally connected to the second electronic device.

The first and second electronic devices 310 and 320 may be detachably connected to each other. According to an embodiment of the present disclosure, the first electronic device 310 may be connected to the second electronic device 320 such that the position thereof can be changed with respect to the second electronic device 320. For example, in cases where the first electronic device 310 is attached to the second electronic device 320, at least a part of the first electronic device 310 may overlap at least a part (e.g., the front or rear surface) of the second electronic device 320. The first electronic device 310 may include, for example, a cover that can be opened and closed with respect to the second electronic device 320. According to an embodiment of the present disclosure, in cases where the first and second electronic devices 310 and 320 are connected to each other, the second electronic device 320 may operate as a main electronic device, and the first electronic device 310 may operate as an auxiliary electronic device. Additionally, the second electronic device 320 may include, for example, an input button 326. According to an embodiment of the present disclosure, the first electronic device 310 may include, for example, an input button that is the same as or similar to the input button 326. The first and second electronic devices 310 and 320 may have, for example, the same functions, or may include different functions. According to an embodiment of the present disclosure, at least some of the operations that are described as being performed in the first electronic device 310 may be performed, for example, in the second electronic device 320. Furthermore, for example, at least some of the operations that are described as being performed in the second electronic device 320 may be performed in the first electronic device 310.

Referring to FIG. 3B, the plurality of electronic devices 300 functionally connected to each other may be separated into the first electronic device 310 and the second electronic device 320. According to an embodiment of the present disclosure, the first electronic device 310 may include, for example, a first connector 314 that is detachably connected to at least a part (e.g., a side surface) of the second electronic device 320. According to an embodiment of the present disclosure, the second electronic device 320 may include, for example, a second connector 324 that is detachably connected to at least a part (e.g., a side surface) of the first electronic device 310. At least one of the first and second connectors 314 and 324 may include the connector described above in relation to FIG. 2. The first or second connector 314 or 324 may be formed at various locations (e.g., the top, the bottom, the left, the right, the front, the rear, etc.) of the first or second electronic device 310 or 320.

According to an embodiment of the present disclosure, the first and second connectors 314 and 324 may be formed in a detachable physical structure. According to an embodiment of the present disclosure, at least one of the first and second connectors 314 and 324 may include a magnet that detachably connects the first and second connectors 314 and 324 using a magnetic force. According to an embodiment of the present disclosure, the second connector 324 may include a rotatable hinge structure. For example, the second connector 324 may be hingedly coupled to the first electronic device 310 to allow the first and second electronic devices 310 and 320 to rotate using the second connector 324.

According to an embodiment of the present disclosure, the detachable physical structure may connect the first and second connectors 314 and 324, for example, by using a connector (e.g., a connector header or a connector socket). According to an embodiment of the present disclosure, the detachable physical structure may connect the first and second connectors 314 and 324, for example, by using a connection of a contact (e.g., a pogo pin, a spring pin, a plate spring, etc.).

Referring to FIG. 3B, the first connector 314 may include, for example, a first contact point 314*a* and a second contact point 314*b*. The second connector 324 may include, for example, a third contact point 324*a* and a fourth contact point 324*b*. According to an embodiment of the present disclosure, when at least some of the plurality of contact points (e.g., the first and second contact points 314*a* and 314*b*) are separated from the corresponding contact points included in the second connector 324, the first electronic device 310 may recognize the detachment from the second electronic device 320 in advance or at the same time as the detachment by using the order, interval, amount, difference, or the like of a signal change in the separated contact points.

For example, the first and second electronic devices 310 and 320 may be coupled to slide relative to each other using a rail structure. In this case, when the first and second electronic devices 310 and 320 are coupled to each other, for example, the first contact point 314*a* of the first electronic device 310 may be correspondingly brought into contact with the third contact point 324*a* of the second electronic device 320, and the second contact point 314*b* of the first electronic device 310 may be correspondingly brought into contact with the fourth contact point 324*b* of the second electronic device 320.

For example, when the first electronic device 310 moves along the rail structure to separate from the second electronic device 320, the contact between the first and third contact points 314*a* and 324*a* may be released, and then the first and fourth contact points 314*a* and 324*b* may make contact with each other. In this way, the first or second electronic device 310 or 320, for example, the first electronic device 310 may be determined to be detached from the second electronic device 320. Similarly, for example, when the first electronic device 310 moves along the rail structure such that the first electronic device 310 is mounted on the second electronic device 320, the first and fourth contact points 314*a* and 324*b* may make contact with each other first. After a predetermined period of time, the contact between the first and fourth contact points 314*a* and 324*b* may be released, and additionally, the first and third contact points 314*a* and 324*a* may make contact with each other. In this way, the first or second electronic device 310 or 320, for example, the first electronic device 310 may be determined to be mounted on the second electronic device 320.

According to an embodiment of the present disclosure, when the first contact point 314*a* experiences a signal change before the second contact point 314*b*, the first electronic device 310 may determine that the first electronic device 310 is to be detached from the second electronic device 320. In addition, for example, when the first contact point 314*a* experiences a signal change after the second contact point 314*b*, the first electronic device 310 may determine that the first electronic device 310 is to be mounted on the second electronic device 320. Similarly, using the third and fourth contact points 324*a* and 324*b*, the second electronic device 320 may determine that the second electronic device 320 is to be mounted on or detached from the first electronic device 310.

According to an embodiment of the present disclosure, the contact points may also be designed to have a predetermined longitudinal length such that the first contact point 314a is simultaneously or substantially simultaneously brought into contact with the fourth contact point 324b when the contact between the first and third contact points 314a and 324a is released. The number, shape, position, or the like of the connectors (e.g., the first and second connectors 314 and 324) and the contact points (e.g., 314a, 314b, 324a, and 324b) corresponding thereto may be modified in various manners.

According to an embodiment of the present disclosure, the first and second electronic devices 310 and 320 may exchange data through wireless communication while being detached from each other. For example, the first and second electronic devices 310 and 320 may include first and second communication modules (not illustrated), respectively, and may transmit and receive a control command for display control over at least one of the first and second displays 312 and 322, or information to be displayed on at least one of the first and second displays 312 and 322. According to an embodiment of the present disclosure, the first and second communication modules (not illustrated) may support, for example, a short-range communication protocol (e.g., Wi-Fi, Wi-Fi direct, wireless gigabits (Wi-Gig), BT, BT low energy (BLE), Zigbee, ultra wideband (UWB), NFC, radio frequency identification (RFID), audio sink, e-field communication (EFC), human body communication (HBC), visible area network, or the like), or a network communication (e.g., the Internet, a LAN, WAN, a telecommunication network, a cellular network, a satellite network, a POTS, or the like). According to an embodiment of the present disclosure, the first and second electronic devices 310 and 320 may also exchange data through wired communication even while being detached from each other.

According to an embodiment of the present disclosure, the first electronic device 310 may be an accessory type (e.g., a card type) of display that can be physically separated from or coupled to the second electronic device 320. For example, a user may separate an accessory type of display from the second electronic device 320 and carry the separated display, and only in case of need, the user may couple (mount) the display with (on) the second display 322. FIGS. 3A and 3B and the contents described in connection therewith are merely various embodiments of the present disclosure, and a structure that may implement any type of detachable electronic device and a control method thereof is not limited thereto. For example, the first or second electronic device 310 or 320 may have a structure of a bracelet, a band, a watch, and various other devices (e.g., glasses, clothes, a headset, earphones, shoes, and the like) that can be worn on a user's body.

Figure 4:
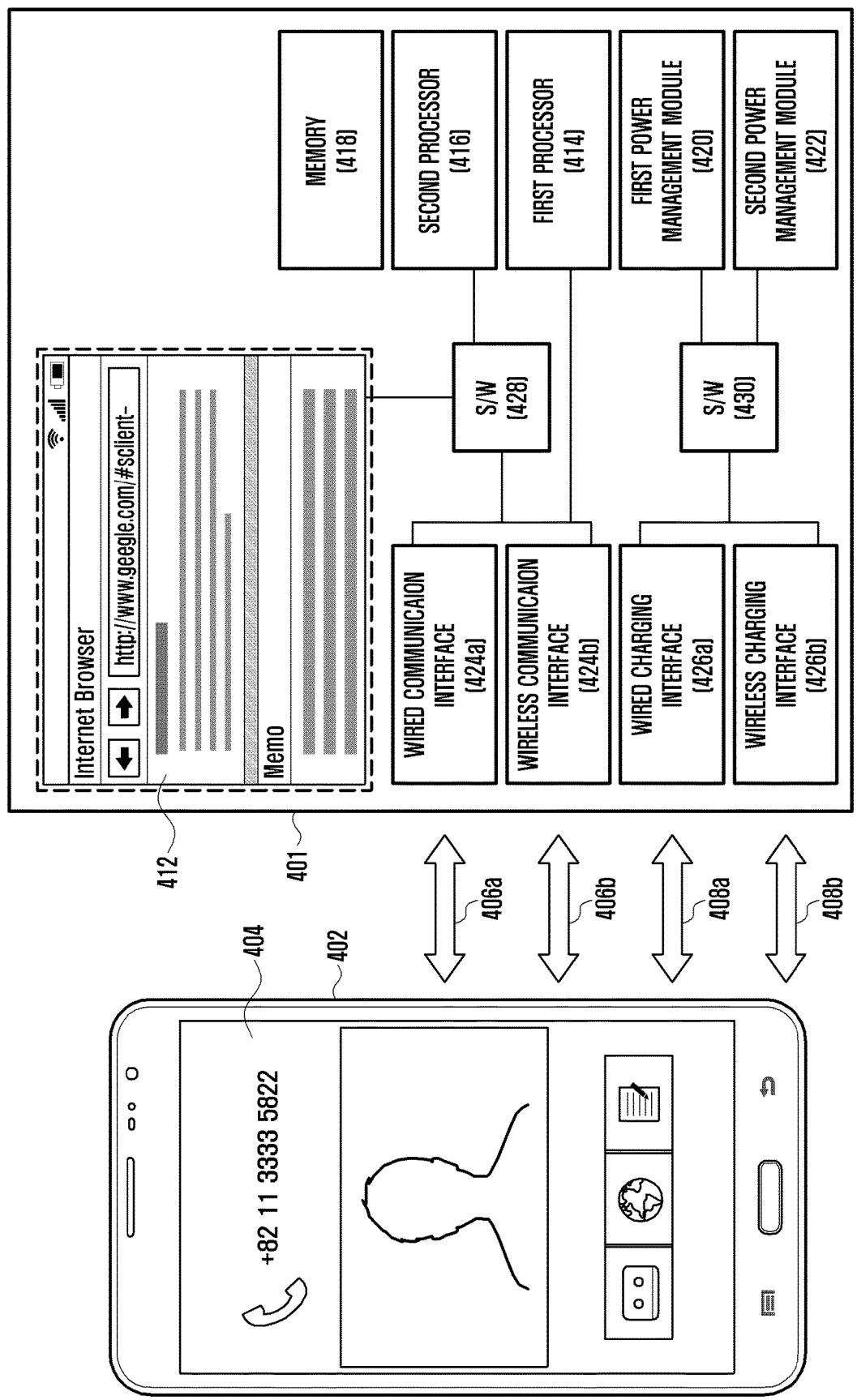
FIG. 4 illustrates an example of displaying information using a first electronic device that is functionally connected to a second electronic device, according to various embodiments of the present disclosure.

FIG. 4 illustrates an example of displaying information using a first electronic device functionally connected to a second electronic device according to various embodiments of the present disclosure.

Referring to FIG. 4, a first electronic device 401 may be, for example, the first electronic device 310 illustrated in FIGS. 3A and 3B. A second electronic device 402 may be, for example, the second electronic device 320 illustrated in FIGS. 3A and 3B. The first electronic device 410 may include, for example, a display 412, a first processor 414, a second processor 416, a memory 418, a first power management module 420, a second power management module 422, a wired communication interface 424a, a wireless communication interface 424b, a wired charging interface 426a, a wireless charging interface 426b, a first switch 428, and a second switch 430. According to an embodiment of the present disclosure, at least some elements included in the first electronic device 401 may be omitted. The second electronic device 402 may include, for example, a display 404. According to an embodiment of the present disclosure, the first processor 414 may include the connection control module 201, which is illustrated in FIG. 2, as a part of a logic performed thereby.

Referring to FIG. 4, the first and second electronic devices 401 and 402 may be connected via a wired communication link 406a, a wireless communication link 406b, a wired charging link 408a, and/or a wireless charging link 408b. The wired communication link 406a or the wired charging link 408a may be connected to, for example, the first connector 314 illustrated in FIG. 3A.

The first electronic device 401 may be detachably connected to the second electronic device 402. The first electronic device 401 may be functionally connected to the second electronic device 402, for example, through a connector (e.g., the first connector 314 or the second connector 324). According to an embodiment of the present disclosure, when the first electronic device 401 is connected to the second electronic device 402, the first electronic device 401 may display data received from the second electronic device 402 on the display 412. Although an embodiment using the display 412 is described in this embodiment of the present disclosure for convenience of description, the present disclosure is not limited thereto, and there may be various embodiments of the present disclosure using various forms of outputs, such as audio, vibration, heat, scent, and the like.

According to an embodiment of the present disclosure, when the first electronic device 401 is connected to the second electronic device 402, at least some elements included in the first electronic device 401 may be deactivated. For example, when the first electronic device 401 is physically coupled to the second electronic device 402, the first electronic device 401 may operate while deactivating at least one of the second processor 416, the second power management module 422, the wireless communication interface 424b, and the wireless charging interface 426b. According to an embodiment of the present disclosure, the first electronic device 401 may be configured by excluding at least some of the elements which are deactivated while the first electronic device 401 is coupled to the second electronic device 402. According to an embodiment of the present disclosure, the second electronic device 402 may perform functions of at least some of the deactivated elements in the first electronic device 401 and may transfer information containing the performance results to the first electronic device 401.

The first processor 414 may perform, for example, operations or data processing to control and/or communicate with one other element in the first electronic device 401. According to an embodiment of the present disclosure, the first processor 414 may process data received from the second electronic device 402.

The wired communication interface 424a may, for example, forward data received from the second electronic device 402 to the first processor 414. According to an embodiment of the present disclosure, the data received from the second electronic device 402 may be forwarded to the display 412 without control of another element of the first electronic device 401 and may be displayed through the display 412. The first processor 414 may, for example, store (e.g., back up) the data received from the second electronic device 402 in the memory 418.

The wired charging interface 426*a* may, for example, transmit power received from the second electronic device 402 to a battery (not illustrated) included in the first processor 401. According to an embodiment of the present disclosure, the wired charging interface 426*a* may transmit the power, received from the second electronic device 402, to another element of the first electronic device 401, for example, through the first power management module 420. The first power management module 420 may be, for example, a module for supplying and/or managing power required for operations of the first electronic device 401. For example, the first power management module 420 may supply relatively lower power than the second power management module 422. The first power management module 420 may further include, for example, a power retention module, and may supply necessary power. In cases where the first and second electronic devices 401 and 402 are coupled to each other, the first electronic device 401 may operate, for example, in a terminal mode to output data received from the second electronic device 402 while consuming low power.

The power retention module may include, for example, a circuit for preserving power and/or operations of the first electronic device 401. For example, clock and gating circuitries may be used to implement the power retention module. According to an embodiment of the present disclosure, the power retention module may retain power supplied from the second electronic device 402. For example, the power retention module may manage power for the elements of the first electronic device 401 in a terminal mode or in a sleep mode. For example, the first electronic device 401 may drive the display 412 and the first processor 414 using power supplied from the power retention module while being mounted on the second electronic device 402.

According to an embodiment of the present disclosure, when the first and second electronic devices 401 and 402 are coupled to each other, the first electronic device 401 may receive power from the second electronic device 402 or an external wireless power supply device through the wireless charging interface 426*b*, and may supply the received power to the other elements included in the first electronic device 401. According to an embodiment of the present disclosure, the first electronic device 401, when receiving power from the second electronic device 402 or another external device in a wired or wireless manner, may stop receiving power from the first electronic device 401.

At least one of the first and second electronic devices 401 and 402 may include a touch sensor on a housing or a display thereof. Various types of sensors (e.g., a digitizer, a magnet, a temperature sensor, a proximity sensor, an antenna, and the like) may be used to detect an external object. According to an embodiment of the present disclosure, when a region where a user (e.g., a user's hand) touches or closely approaches in at least one of the first and second electronic devices 401 and 402 satisfies a specified condition (e.g., location, area, pressure, time, or the like), the first electronic device 401 may determine that the user intends to detach the first electronic device 401 from the second electronic device 402. For example, the determination may be performed based on whether an interval between the time when the user (e.g., the user's hand) is detected in each of the first and second electronic devices 401 and 402 corresponds to a specified interval. In addition, the determination may also be performed further based on whether the first or second electronic device 401 or 402 moves in a specified direction within a specified time after the user (e.g., the user's hand) is detected in the first and second electronic devices 401 and 402.

Similarly, when regions where a user (e.g., a user's hand) touches or approaches the first and second electronic devices 401 and 402 to satisfy another specified condition (e.g., location, area, pressure, time, or the like), the first electronic device 401 may determine that the user intends to mount the first electronic device 401 on the second electronic device 402.

According to various embodiments of the present disclosure, for example, the second electronic device 402 may perform an operation of determining that there will be a change (e.g., separation) in a connection state between the first and second electronic devices 401 and 402, and may transfer the determination result to the first electronic device 401.

When it is determined that there will be a change (e.g., separation) in the connection state between the first and second electronic devices 401 and 402, the first electronic device 401 may display a screen, for example, using data stored in the memory 418 rather than data received from the second electronic device 402. According to an embodiment of the present disclosure, the first processor 414 may switch a data source from the wired communication interface 424*a* to the memory 418. Additionally, the first processor 414 may transfer information relating to the switching operation to the second electronic device 402. In this case, the second electronic device 402 may transmit data through a wireless communication interface (not illustrated) of the second electronic device 402 and the wireless communication interface 424*b* of the first electronic device 401. The first electronic device 401 may maintain the screen displayed on the display 412 by using data received through the wireless communication interface 424*b* when the first electronic device 401 is separated from the second electronic device 402. According to an embodiment of the present disclosure, when it is determined that there will be a change (e.g., separation) in the connection state between the first and second electronic devices 401 and 402, the first electronic device 401 may display a screen using the data stored in the memory 418, and thereafter, when it is determined that the change has occurred, the first electronic device 401 may display a screen using the data received from the second electronic device 402.

According to an embodiment of the present disclosure, the first processor 414 may compare data received through the wired communication interface 424*a* or the wireless communication interface 424*b* with the data stored in the memory 418, and when the two pieces of data are not at least partially the same as each other, the first processor 414 may update the data stored in the memory 418 to the data received through the wired communication interface 424*a* or the wireless communication interface 424*b*. According to an embodiment of the present disclosure, the first processor 414 may periodically or intermittently store data received though the wired communication interface 424*a* or the wireless communication interface 424*b*.

According to an embodiment of the present disclosure, when it is determined that there will be a change (e.g., separation) in the connection state between the first and second electronic devices 401 and 402, the first electronic device 401 may stop a charging operation that uses power supplied from the second electronic device 402. The first electronic device 401 may maintain the power thereof, for example, by using the first power management module 420. In addition, for example, the first electronic device 401 may change the second power management module 422 from a deactivated state to an activated state. For example, the first power management module 420 may be deactivated when the second power management module 422 is activated. The second power management module 422 may supply power to the second processor 416. The second power management module 422 may, for example, supply or control a power (e.g., current) greater than the first power management module 420. According to an embodiment of the present disclosure, the first electronic device 401 may not deactivate the first power management module 420, and may perform power supply and/or power management using the first and second power management modules 420 and 422.

The second switch 430 may selectively provide power to the elements included in the first electronic device 401 from the first power management module 420 to the second power management module 422. The switching operation may be performed, for example, under the control of the first or second processor 414 or 416, or hardware switching may also be performed by detecting, by the second switch 430, a change in the connection state between the first and second electronic devices 401 and 402.

When it is determined that there will be a change (e.g., separation) in the connection state between the first and second electronic devices 401 and 402, the first processor 414 may change the second processor 416 from an deactivated state to an activated state. The activation of the second processor 416 may include, for example, booting of the second processor 416. The first processor 414 may be, for example, driven by using lower power and/or frequency than the second processor 416. In addition, for example, the first processor 414 may be a processor that provides lower performance than the second processor 416. According to an embodiment of the present disclosure, the first processor 414 may be a processor that performs processing on at least some elements (e.g., a motion sensor (e.g., an acceleration sensor 740E), a microphone (e.g., a microphone 788), a touch sensor (e.g., a touch panel 752), or the like) of the first electronic device 401 when the first electronic device 401 operates in a low-power mode (e.g., a sleep mode). According to an embodiment of the present disclosure, the first processor 414 may also be referred to as, for example, a micro control unit (MCU), and the second processor 416 may also be referred to as, for example, an AP. The first and second processors 414 and 416 may also be included in a single processor.

According to an embodiment of the present disclosure, when the second processor 416 is activated, the first processor 414 may be changed to a deactivated state (e.g., a sleep or off state). When the first processor 414 is deactivated, the second processor 416 may perform operations or data processing based on control and/or communication from the other elements of the first electronic device 401. According to an embodiment of the present disclosure, the first electronic device 401 may also perform operations or data processing without deactivating the first processor 414.

The first switch 428 may switch, for example, a data path for the display 412 from the wired communication interface 424a to the second processor 416. The switching operation may be performed, for example, under the control of the first or second processor 414 or 416, or the switching may also be performed by detecting, by the first switch 428, a change in the connection state between the first and second electronic devices 401 and 402. The first electronic device 401, when being separated from the second electronic device 402, may operate in a standalone mode in which the first electronic device 401 may operate without the second electronic device 402. According to an embodiment of the present disclosure, a change between a terminal mode and a standalone mode may be performed, for example, according to a user's selection input. According to an embodiment of the present disclosure, a change between a terminal mode and a standalone mode may be performed, for example, according to the distance between the first and second electronic devices 401 and 402.

When it is determined that there will be a change (e.g., separation) in the connection state between the first and second electronic devices 401 and 402, the first electronic device 401 may be wirelessly supplied with power, for example, through the wireless charging interface 426b. According to an embodiment of the present disclosure, the wireless charging interface 426b may include, for example, a circuit that may serve as a source or a target for inductive or resonance wireless power supply system. The circuit operating as a source may include, for example, a transmission resonator (e.g., a Tx resonator), an amplifier, and a driver (e.g., a gate driver). The circuit operating as a target may include, for example, a reception resonator (e.g., an Rx resonator), a matching circuit, a rectifier circuit, and a regulator circuit. According to an embodiment of the present disclosure, the wireless charging interface 426b may include an MCU that can control elements of the wireless charging interface 426b. According to an embodiment of the present disclosure, the wireless charging interface 426b may also include an out-band communication system, such as Zigbee, etc., or an in-band communication system for communication between the source and the target. According to an embodiment of the present disclosure, some of the elements described above may be omitted, or other elements may be added, and another type of wireless power technology may also be used.

The power received by the first electronic device 401 in a wireless manner may be provided through various methods. According to an embodiment of the present disclosure, when it is determined that there will be a change (e.g., separation) in the connection state between the first and second electronic devices 401 and 402, the first electronic device 401 may receive wireless power from a wireless charging station (e.g., a wireless charging pad) or the second electronic device 402. The above described operations may also be executed after it is identified that there was a change in the connection state between the first and second electronic devices 401 and 402. Further, the above described operations may also be executed when the residual power of a battery of the first electronic device 401 is lower than or equal to a specified level (e.g., about 50% of a battery capacity).

According to an embodiment of the present disclosure, the second electronic device 402 may receive higher power from the external device and may forward at least a part of the received power to the first electronic device 401. For example, when it is determined that there will be a change (e.g., combination or separation) in the connection state between the first and second electronic devices 401 and 402, or it is determined that a change has occurred, the second electronic device 402 may request an external wireless power supply source (e.g., a wireless charging pad) to change the amount of power (e.g., voltage or current) supplied to the second electronic device 402.

The second electronic device 402 may identify elements that are included in the first electronic device 401. For example, when it is determined that the first electronic device 401 is located within a specified distance from the second electronic device 402, or the first electronic device 401 is or will be mounted on the second electronic device 402, the second electronic device 402 may receive information on the display 412 of the first electronic device 401 from the first electronic device 401. The information on the display 412 of the first electronic device 401 may include, for example, at least one of the type of a display panel (e.g., an LCD, an active matrix OLED (AMOLED), a transparent display, an e-ink display, or the like), a resolution, or ID information. The second electronic device 402 may transmit a suitable format of image data to the first electronic device 401 based on the information on the display 412. When the information on the display 412 of the first electronic device 401 is not identified, the second electronic device 402 may transmit, to the first electronic device 401, image data with a pre-specified format or a format selected by a user's input. According to an embodiment of the present disclosure, at least based on manufacturing information (e.g., a maker) of the display 412, the second electronic device 402 may acquire the information on the display 412 through a server.

According to an embodiment of the present disclosure, in response to combination with the first electronic device 401, the second electronic device 402 may display, through the display 412 of the first electronic device 401, at least a part of a screen that is displayed on the second electronic device 402 before the combination with the first electronic device 401. According to an embodiment of the present disclosure, in response to separation from the first electronic device 401, the second electronic device 402 may display, through the display 404 thereof, at least a part of a screen that is displayed on the first electronic device 401 before the separation from the first electronic device 401.

According to an embodiment of the present disclosure, the first electronic device 401, while mounted on the second electronic device 402, may display a screen relating to a function or application that is executed in the second electronic device 402. According to an embodiment of the present disclosure, when a telephone call application is executed in the second electronic device 402, the second electronic device 402 may automatically execute, for example, a different application (e.g., a memo application) relating to the telephone call application. Alternatively, for example, in response to a user's selection input identified through a user interface provided by the telephone call application, the second electronic device 402 may also execute an application selected by the user. According to various embodiments of the present disclosure, the second electronic device 402 may output content relating to the telephone call application, and may output content relating to the different application (e.g., memo application) through the first electronic device 401.

According to an embodiment of the present disclosure, the first electronic device 401, while mounted on the second electronic device 402, may display a first screen relating to a first application and a second screen relating to a second application by dividing a single screen. The first application may be, for example, a browser application, and the second application may be, for example, a memo application. According to an embodiment of the present disclosure, when it is determined that the first electronic device 401 is already detached or is to be detached from the second electronic device 402, the first electronic device 401 may stop displaying at least one of the first screen relating to the first application and the second screen relating to the second application. As the display of one screen is stopped, the size of the first or second screen, which is continually displayed, may be changed (e.g., increased). According to an embodiment of the present disclosure, the first electronic device 401 may simultaneously or substantially simultaneously display a first screen relating to an application executed in the first electronic device and a second screen relating to an application executed in the second electronic device by dividing the screen of the display 412.

According to an embodiment of the present disclosure, when it is determined that the first electronic device 401 is already detached or is to be detached from the second electronic device 402, the first electronic device 401 may continue to display at least a part of content relating to the different application (e.g., memo application) which is output through the first electronic device 401.

According to an embodiment of the present disclosure, when it is determined that the first electronic device 401 is already detached or is to be detached from the second electronic device 402, the first electronic device 401 may execute a specified application based on the determination. The specified application may be an application that is executed in the second electronic device 402 and uses the display 412 of the first electronic device 401, or a pre-specified application that can process (e.g., manipulate) data received from the second electronic device 402. For example, when a first camera application that is executed in the second electronic device 402 cannot be executed in the first electronic device 401, the first electronic device 401 may execute a second camera application that differs from the first camera application.

According to an embodiment of the present disclosure, when the first electronic device 401 executes an application that may perform at least some functions of an application that is currently executed in the second first electronic device 402, the second electronic device 402 may accordingly stop executing the corresponding application. According to an embodiment of the present disclosure, the first electronic device 401, while being separated from the second electronic device 402, may periodically or intermittently synchronize data, which is input or output through an application executed in the first electronic device 401 in relation to the second electronic device 402, with the second electronic device 402. According to an embodiment of the present disclosure, when the first electronic device 401 is mounted on the second electronic device 402 or is located within a predetermined distance from the second electronic device 402, the first electronic device 401 may transfer, to the second electronic device 402, the data which is input or output through the application executed in the first electronic device 401 to the second electronic device 402.

The first electronic device 401, while being mounted on the second electronic device 402, may receive and store data created or acquired through an application executed in the second electronic device 402. For example, when the first electronic device 401 is mounted to a third electronic device (not illustrated) within a predetermined time after being detached from the second electronic device 402, the first electronic device 401 may provide the data to the third electronic device. The third electronic device may be a device that is specified in advance while the first electronic device is mounted on the second electronic device, or a device that is identified to belong to the same user. According to an embodiment of the present disclosure, the third electronic device, when the first electronic device 401 is mounted thereon, may represent (e.g., display) data received from the first electronic device 401 by executing an application that is executed in the second electronic device 402.

For example, the second electronic device 402, while the first electronic device 401 is mounted thereon, may execute a camera application according to a request of a user or an external device (e.g., the first electronic device 401). The second electronic device 402 may store an image (e.g., a still image or a moving image) acquired through the camera application in at least one of the first and second electronic devices 401 and 402. According to an embodiment of the present disclosure, when it is determined that the first electronic device 401 is already detached or is to be detached from the second electronic device 402, images acquired while the first electronic device 401 is mounted on the second electronic device 402 may be transmitted to the first electronic device 401. The images may be used by the first electronic device 401 according to a specified condition (e.g., time or distance). When the specified condition is not satisfied, the images may be deleted from the first electronic device 401. The specified condition may include, for example, an elapsed time from when the first electronic device 401 is separated from the second electronic device 402. In addition, the specified condition may include, for example, the distance between the first and second electronic devices 401 and 402. According to an embodiment of the present disclosure, when the first electronic device 401 is detached from the second electronic device 402 and mounted on the third electronic device, the images may be transmitted to the third electronic device. According to an embodiment of the present disclosure, when the first electronic device 401 is detached from the third electronic device, the images may be deleted from the third electronic device. According to an embodiment of the present disclosure, the first electronic device 401, while being mounted on the second electronic device 402, may serve as a device that inputs and outputs authentication information under the control of the second electronic device 402. In cases where the first electronic device 401 is detached from the second electronic device 402, the first electronic device 401 may directly process authentication information. According to an embodiment of the present disclosure, the first electronic device 401 may determine a security level when the first electronic device 401 is detached from the second electronic device 402 based on an input received while mounted on the second electronic device 402. For example, while a payment related application is executed in the second electronic device 402, when the first electronic device 401 is separated without a separate user input, a user may perform a payment to the extent of a first amount of money through the first electronic device 401. For example, while a payment related application is executed in the second electronic device 402, when the first electronic device 401 is separated after authentication of a user (e.g., a signature, a face, a fingerprint, etc.), the user may perform a payment to the extent of a second amount of money through the first electronic device 401. According to an embodiment of the present disclosure, an electronic payment level (e.g., an amount of money) that can be performed through the first electronic device may vary according to authentication methods.

According to an embodiment of the present disclosure, the first electronic device 401, while being mounted on the second electronic device 402, may provide a display relating to a camera application executed in the second electronic device 402. For example, the first electronic device 401 may display a preview screen of the camera application, or an image (e.g., a still image or a moving image) acquired (e.g., captured) through the camera application. When the first electronic device 401 is detached from the second electronic device 402 while displaying the preview screen, the first electronic device 401 may continue to display the preview screen, for example, by using the wireless communication interface 424*b*.

According to an embodiment of the present disclosure, when the first electronic device 401 is located in a specified place, or is fixed in a specified form after being separated from the second electronic device 402, the first electronic device 401 may display a notification relating to the second electronic device 402. In this case, the first electronic device 401 may display relevant information, such as, for example, time, a photo, a schedule, etc. According to an embodiment of the present disclosure, in cases where a plurality of first electronic devices 401 are provided, the second electronic device 402 may transmit identical or different data to the plurality of first electronic devices 401. According to an embodiment of the present disclosure, the first and second electronic devices 401 and 402 may provide a telephone call service while being separated from each other. According to an embodiment of the present disclosure, data stored in the first electronic device 401 may be accessed or provided when the first electronic device 401 is mounted on the second electronic device 402. According to an embodiment of the present disclosure, the first electronic device 401 may zoom in/out on a screen output through the first electronic device 401, or may turn volume up/down according to the distance from the second electronic device 402. According to an embodiment of the present disclosure, at least some functions of the first electronic device 401 may be locked when the first electronic device 401 is separated from the second electronic device 402, and may be unlocked when first electronic device 401 is coupled to the second electronic device 402.

According to various embodiments of the present disclosure, an electronic device may include a connector detachably connected to another electronic device external to the electronic device, a determination module that determines that there will be a change in a connection state between the electronic device and the other electronic device through the connector, at least partially based on an event that occurs in connection with at least one of the electronic device and the other electronic device, and a provision module that provides content provided before the determination in connection with an application executed in the other electronic device, or another piece of content associated with the application, based on at least the determination.

According to various embodiments of the present disclosure, the determination module may detect whether the first electronic device is detached from the second electronic device, based on at least a part of the change.

According to various embodiments of the present disclosure, the determination module may identify whether the change occurs before a specified time passes from a time point when the event is detected.

According to various embodiments of the present disclosure, the determination module may acquire where and when a user touches the first or second electronic device, from a touch event detected through a touch sensor functionally connected to at least one of the first and second electronic devices.

According to various embodiments of the present disclosure, the first and second electronic devices may be connected to each other through a plurality of first contact points of the first electronic device and a plurality of second contact points of the second electronic device, and the event may include an event that occurs when at least one of the first contact points is separated from a second contact point corresponding to the at least one first contact point among the second contact points.

According to various embodiments of the present disclosure, the electronic device may further include a change module, and the change module may change at least one of a plurality of processors included in the electronic device from a deactivated state to an activated state.

According to various embodiments of the present disclosure, the plurality of processors may include a first processor and a second processor, and the provision module may perform provision (function) of the content through the first processor before the determination and may perform provision (function) of the content or another piece of content through the second processor based on the determination.

According to various embodiments of the present disclosure, the electronic device may further include a change module, and the change module may activate a wireless power transmission/reception function of the electronic device or the other electronic device based on at least the determination.

According to various embodiments of the present disclosure, the provision module may execute another application associated with the content in the electronic device based on the determination and may provide the content or another piece of content through the other application.

According to various embodiments of the present disclosure, the provision module may stop the providing of the content or the other content when the distance between the electronic device and the other electronic device is beyond a specified range.

According to various embodiments of the present disclosure, provided is a storage medium having instructions stored therein. The instructions are set to make at least one processor perform at least one operation when the instructions are executed by the at least one processor, in which the at least one operation may include providing, by a first electronic device, first content associated with an application that is executed in a second electronic device detachably connected thereto, determining that there will be a change in a connection state between the first and second electronic devices, at least partially based on an event that occurs at least in the first or second electronic device, and providing, by the first electronic device, the first content, or second content associated with the application based on at least the determination.

Figure 5:
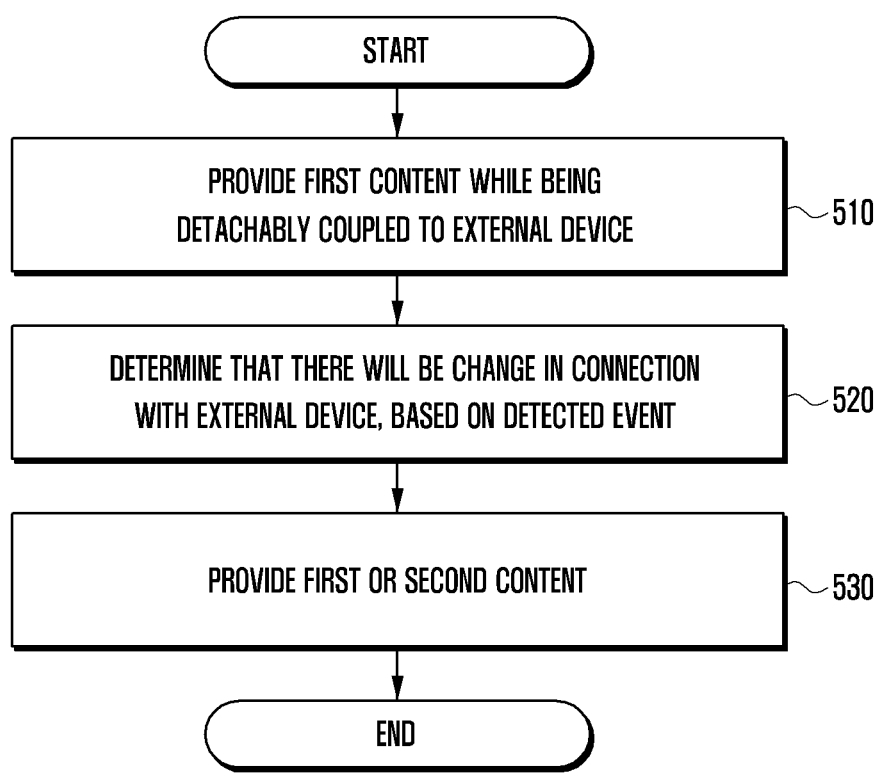
FIG. 5 is a flowchart of a method of displaying information in an electronic device that is coupled to an external device according to various embodiments of the present disclosure.

FIG. 5 is a flowchart of a method of displaying information in an electronic device detachably coupled to an external device according to various embodiments of the present disclosure.

Referring to FIG. 5, in operation 510, for example, the electronic device (e.g., the provision module 240) may be detachably coupled to an external device and may provide (e.g., display) first content associated with an application executed in the external device. For example, the first content may be received from the external device through wired communication. For example, the first content may also be received from the external device through wireless communication.

In operation 520, for example, the electronic device (e.g., the determination module 220) may determine that there will be a change in the connection state between the electronic device and the external device, based on an event detected by the electronic device or the external device. For example, a change in the connection state between the electronic device and the external device may include coupling (mounting) or separation (detachment) of the electronic device and the external device. For example, before the electronic device is detached from or mounted on the external device, the electronic device may recognize the detachment and the mounting in advance. Additionally, the electronic device may determine whether the change occurs within a predetermined time from when it is determined that there will be a change in the connection state between the electronic device and the external device.

In operation 530, for example, the electronic device (e.g., the provision module 220) may provide the first content or second content relating to the application. For example, the electronic device may provide the first or second content by executing a different application.

According to an embodiment of the present disclosure, in regard to providing the first or second content, the electronic device (e.g., the change module 230) may change at least some of the plurality of processors included therein from an activated state to a deactivated state, or vice versa. According to an embodiment of the present disclosure, in regard to providing the first or second content, the electronic device may wirelessly receive power.

Figure 6:
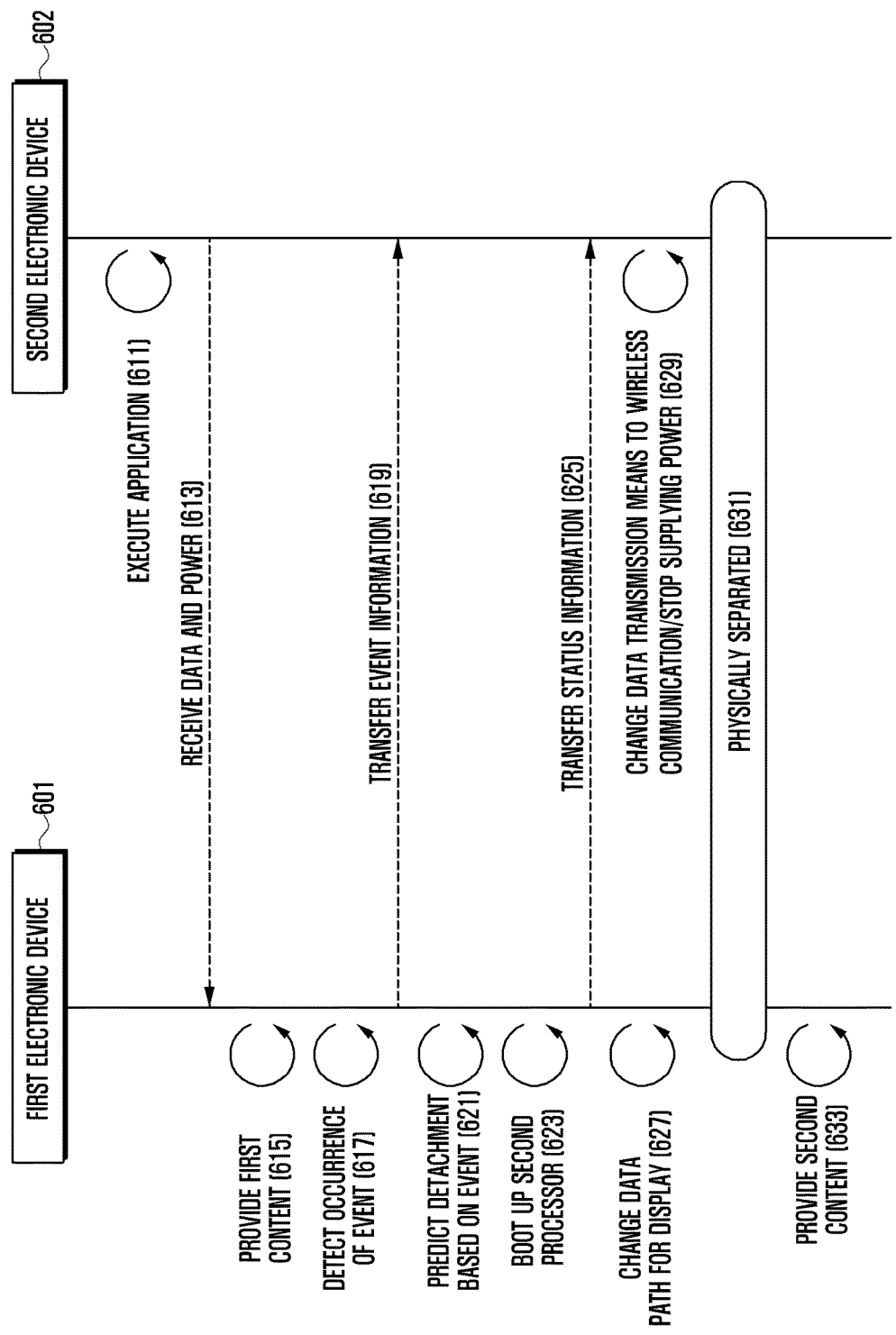
FIG. 6 is a flow diagram of a method of displaying information in a first electronic device that is coupled to a second electronic device, according to various embodiments of the present disclosure.

FIG. 6 is a flow diagram of a method of displaying information in a first electronic device detachably coupled to a second electronic device according to various embodiments of the present disclosure.

Referring to FIG. 6, a first electronic device 601 (e.g., the first electronic device 310) and a second electronic device (e.g., the second electronic device 320) may be physically coupled to each other. In operation 611, for example, the second electronic device 602 may execute an application. In operation 613, the first electronic device 601 may receive, from the second electronic device 602, data and/or power required to provide first content. The first electronic device 601 may receive the data, for example, through wired communication. According to an embodiment of the present disclosure, the first electronic device 601 may also receive the data through wireless communication. In operation 615, for example, the first electronic device 601 may provide the first content to a user using the received data. In operation 617, the first electronic device 601 may detect an event generated in the first or second electronic device 601 or 602. In operation 619, the first electronic device 601 may transfer information associated with the detected event to the second electronic device 602. According to an embodiment of the present disclosure, the first electronic device 601 may also receive, from the second electronic device 602, the information associated with the event detected by the second electronic device 602.

In operation 621, for example, based on the detected event, the first electronic device 601 may determine that the first electronic device 601 is to be detached from the second electronic device 602. For example, based on the information on the event which is exchanged with the second electronic device 602 in operation 619, the first electronic device 601 may identify the order or interval of a signal change detected by a touch sensor or connector and may accordingly predict that the first electronic device 601 is to be detached from the second electronic device 602.

In operation 623, for example, the first electronic device 601 may boot up a second processor (e.g., the second processor 416). According to an embodiment of the present disclosure, the first electronic device 601 may deactivate a first processor when the second processor is booted. In operation 625, for example, the first electronic device 601 may transfer, to the second electronic device 602, status information thereof that contains information regarding whether the second processor is booted. In operation 627, for example, the first electronic device 601 may change a data path for a display. According to an embodiment of the present disclosure, the first electronic device 601 may continue to display a screen using data that is backed up in a memory.

In operation 629, for example, the second electronic device 602 may change a means for data transmission to the first electronic device 601 from wired communication to wireless communication. According to an embodiment of the present disclosure, the second electronic device 602 may stop the means for data transmission to the first electronic device 601. In this case, the first electronic device 601 may provide, to the user, data stored in the first electronic device 601, or content received from another external electronic device (e.g., a server).

In operation 631, for example, the first electronic device 601 may identify that the first and second electronic devices 601 and 602 have been completely or substantially completely physically separated from each other. In operation 633, for example, the first electronic device 601 may provide second content associated with the application executed in the second electronic device 602. According to an embodiment of the present disclosure, the first electronic device 601 may seamlessly or substantially seamlessly provide the first content while the first and second electronic devices 601 and 602 are completely or partially separated from each other.

According to various embodiments of the present disclosure, the operation 611 of executing the application and a series of processes in operations 613 to 633 of changing the service may be executed in a different order, simultaneously, or in parallel unlike as illustrated in FIG. 6. According to an embodiment of the present disclosure, the operation 611 may be executed while the operation 613 is executed, or after the operation 613 is executed. According to an embodiment of the present disclosure, in regard to the operations 625 and 627, the first electronic device 601 may change the data path for the display before transferring the status information to the second electronic device 602. Alternatively, for example, the operations 625 and 627 may also be simultaneously executed. According to an embodiment of the present disclosure, in regard to the operation 633, the operation of providing the second content by the first electronic device 601 may also be executed before the first and second electronic devices 601 and 602 are separated from each other.

According to various embodiments of the present disclosure, a method of providing content in a first electronic device may include providing, by the first electronic device, first content associated with an application that is executed in a second electronic device detachably connected to the first electronic device, determining that there will be a change in a connection state between the first and second electronic devices, at least partially based on an event that occurs in connection with at least one of the first and second electronic devices, and providing, by the first electronic device, the first content, or second content associated with the application based on at least the determination.

According to various embodiments of the present disclosure, the determining may include detecting whether the first electronic device is detached from the second electronic device, based on at least a part of the change.

According to various embodiments of the present disclosure, the method may further include identifying whether the change occurs before a specified time passes from a time point when the event is detected.

According to various embodiments of the present disclosure, the determining may include acquiring where and when a user touches the first or second electronic device, from a touch event detected through a touch sensor functionally connected to at least one of the first and second electronic devices.

According to various embodiments of the present disclosure, the first and second electronic devices may be connected to each other through a plurality of first contact points of the first electronic device and a plurality of second contact points of the second electronic device, and the event may include an event that occurs when at least one of the first contact points is separated from a second contact point corresponding to the at least one first contact point among the second contact points.

According to various embodiments of the present disclosure, the determining may include acquiring information associated with the event from the second electronic device.

According to various embodiments of the present disclosure, the determining may include changing at least one processor corresponding to the first content or the application among a plurality of processors of the first electronic device from a deactivated state to an activated state.

According to various embodiments of the present disclosure, the providing of the first or second content may include: executing, by the first electronic device, another application associated with the first content; and providing the first or second content through the other application.

According to various embodiments of the present disclosure, the second content may include the same content as the first content.

According to various embodiments of the present disclosure, the second content may include different content from the first content.

According to various embodiments of the present disclosure, the method may further include stopping the providing of the first or second content when the distance between the first and second electronic devices is beyond a specified range.

Figure 7:
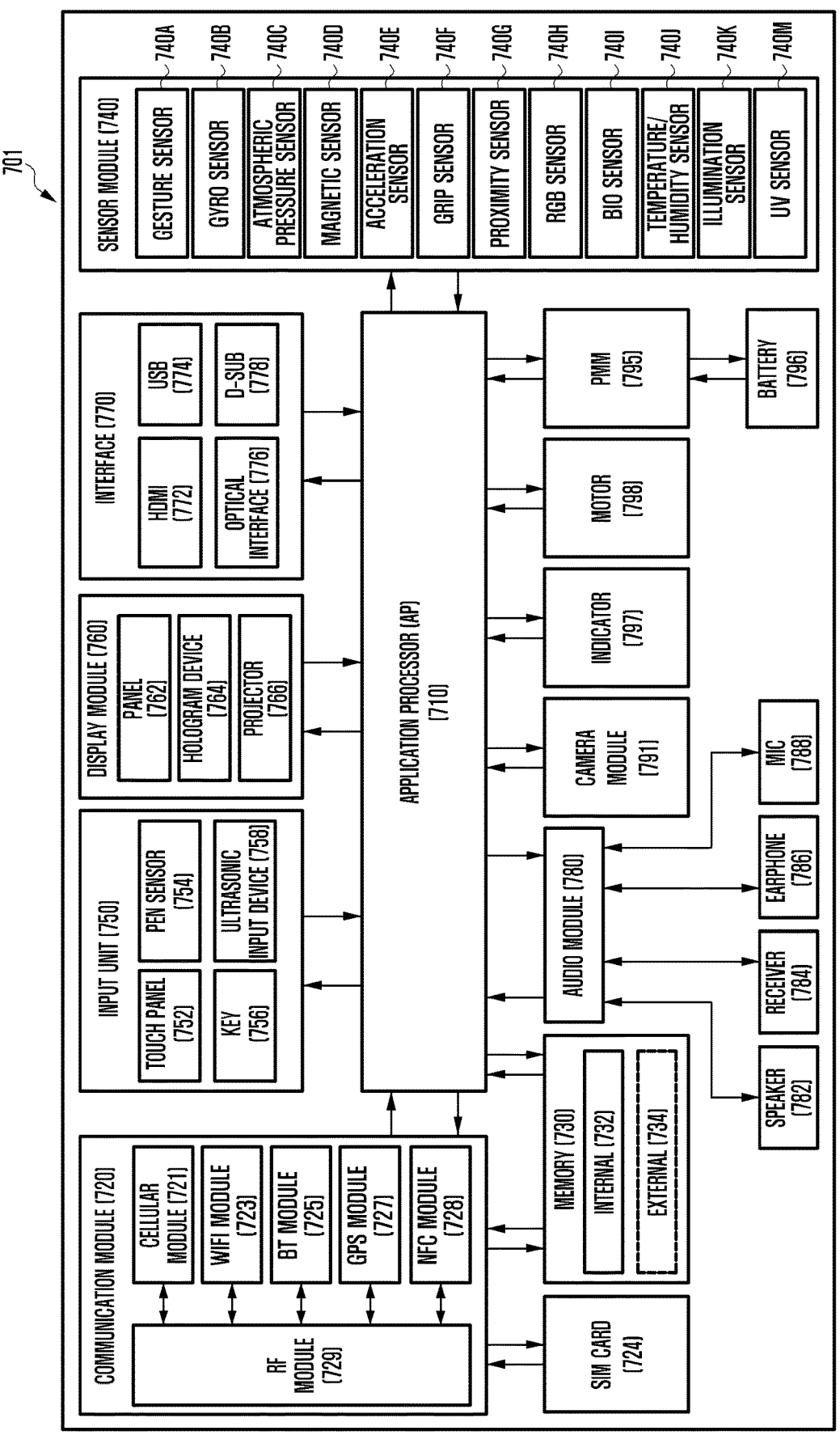
FIG. 7 is a block diagram of an electronic device according to various embodiments of the present disclosure.

FIG. 7 is a block diagram of an electronic device according to various embodiments of the present disclosure.

Referring to FIG. 7, an electronic device 701 may include the entirety or a part of the electronic device 101 illustrated in FIG. 1. The electronic device 701 may include at least one AP 710, a communication module 720, a subscriber identification module (SIM) card 724, a memory 730, a sensor module 740, an input device 750, a display 760, an interface 770, an audio module 780, a camera module 791, a power management module 795, a battery 796, an indicator 797, and a motor 798.

The processor 710 may control a plurality of hardware or software components connected to the processor 710 by driving an operating system or an application and perform processing of various pieces of data and calculations. The processor 710 may be implemented by, for example, a system on chip (SoC). According to an embodiment of the present disclosure, the processor 710 may further include a graphics processing unit (GPU) and/or an image signal processor. The processor 710 may include at least some (e.g., a cellular module 721) of the elements illustrated in FIG. 7. The processor 710 may load, into a volatile memory, instructions or data received from at least one (e.g., a non-volatile memory) of the other elements and may process the loaded instructions or data, and may store various data in a non-volatile memory.

The communication module 720 may have a configuration equal or similar to that of the communication interface 170 of FIG. 1. The communication module 720 may include, for example, a cellular module 721, a Wi-Fi module 723, a BT module 725, a GPS module 727, an NFC module 728, and a RF module 729.

The cellular module 721 may offer a voice call, a video call, a message service, an internet service, or the like through a communication network (e.g., LTE, LTE-A, CDMA, WCDMA, UMTS, WiBro, or GSM, etc.). Additionally, the cellular module 721 may perform identification and authentication of the electronic device in the communication network, using the SIM card 724. According to an embodiment of the present disclosure, the cellular module 721 may perform at least part of functions the AP 710 can provide. For example, the cellular module 721 may perform at least part of a multimedia control function.

Each of the WiFi module 723, the BT module 725, the GPS module 727 and the NFC module 728 may include a processor for processing data transmitted or received there through. Although FIG. 7 shows the cellular module 721, the WiFi module 723, the BT module 725, the GPS module 727 and the NFC module 728 as different blocks, at least part of them may be contained in a single integrated circuit (IC) chip or a single IC package in an embodiment of the present disclosure.

The RF module 729 may transmit and receive data, e.g., RF signals or any other electric signals. Although not shown, the RF module 729 may include a transceiver, a power amplifier module (PAM), a frequency filter, a low noise amplifier (LNA), or the like. Also, the RF module 729 may include any component, e.g., a wire or a conductor, for transmission of electromagnetic waves in a free air space. Although FIG. 7 shows that the cellular module 721, the WiFi module 723, the BT module 725, the GPS module 727 and the NFC module 728 share the RF module 729, at least one of them may perform transmission and reception of RF signals through a separate RF module in an embodiment of the present disclosure.

The SIM card 724 may be a specific card formed of SIM and may be inserted into a slot formed at a certain place of the electronic device. The SIM card 724 may contain therein an IC card identifier (ICCID) or an international mobile subscriber identity (IMSI).

The memory 730 (e.g., the memory 130) may include an internal memory 732 and an external memory 734. The internal memory 732 may include, for example, at least one of a volatile memory (e.g., dynamic random access memory (DRAM), static RAM (SRAM), synchronous DRAM (SDRAM), etc.) or a nonvolatile memory (e.g., one time programmable read-only memory (OTPROM), PROM, erasable and PROM (EPROM), electrically EPROM (EEPROM), mask ROM, flash ROM, NAND flash memory, NOR flash memory, etc.). According to an embodiment of the present disclosure, the internal memory 732 may have the form of a solid state drive (SSD).

The external memory 734 may include a flash drive, e.g., compact flash (CF), secure digital (SD), micro-SD, mini-SD, extreme digital (xD), memory stick, or the like. The external memory 734 may be functionally connected to the electronic device 701 through various interfaces. According to an embodiment of the present disclosure, the electronic device 701 may further include a storage device or medium such as a hard drive.

The sensor module 740 may measure physical quantity or sense an operating status of the electronic device 701, and then convert measured or sensed information into electric signals. The sensor module 740 may include, for example, at least one of a gesture sensor 740A, a gyro sensor 740B, an atmospheric sensor 740C, a magnetic sensor 740D, an acceleration sensor 740E, a grip sensor 740F, a proximity sensor 740G, a color sensor 740H (e.g., red, green, blue (RGB) sensor), a biometric sensor 740I, a temperature-humidity sensor 740J, an illumination sensor 740K, and a ultraviolet (UV) sensor 740M. Additionally or alternatively, the sensor module 740 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 740 may include a control circuit for controlling one or more sensors equipped therein. In some various embodiments of the present disclosure, the electronic device 701 may further include a processor configured to control the sensor module 740, as a part of the processor 710, or separately from the processor 710, and may control the sensor module 740 while the processor 710 is in a sleep state.

The input unit 750 may include a touch panel 752, a digital pen sensor 754, a key 756, or an ultrasonic input unit 758. The touch panel 752 may recognize a touch input in a manner of capacitive type, resistive type, IR type, or ultrasonic type. Also, the touch panel 752 may further include a control circuit. In case of a capacitive type, a physical contact or proximity may be recognized. The touch panel 252 may further include a tactile layer. In this case, the touch panel 252 may offer a tactile feedback to a user.

The digital pen sensor 754 may be formed in the same or similar manner as receiving a touch input or by using a separate recognition sheet. The key 756 may include, for example, a physical button, an optical key, or a keypad. The ultrasonic input unit 758 is a specific device capable of identifying data by sensing sound waves with a microphone 788 in the electronic device 701 through an input tool that generates ultrasonic signals, thus allowing wireless recognition.

The display 760 (e.g., the display 160) may include a panel 762, a hologram 764, or a projector 766. The panel 762 may be, for example, LCD, AM-OLED, or the like. The panel 762 may have a flexible, transparent or wearable form. The panel 762 may be formed of a single module with the touch panel 752. The hologram 764 may show a stereoscopic image in the air using interference of light. The projector 766 may project an image onto a screen, which may be located at the inside or outside of the electronic device 701. According to an embodiment of the present disclosure, the display 760 may further include a control circuit for controlling the panel 762, the hologram 764, and the projector 766.

The interface 770 may include, for example, an HDMI 772, a USB 774, an optical interface 776, or a D-subminiature (D-sub) 778. The interface 770 may be contained, for example, in the communication interface 170 shown in FIG. 1. Additionally or alternatively, the interface 770 may include, for example, a mobile high-definition link (MHL) interface, an SD card/multi-media card (MMC) interface, or an IR data association (IRDA) interface.

The audio module 780 may perform a conversion between sounds and electric signals. At least part of the audio module 780 may be contained, for example, in the input/output interface 150 shown in FIG. 1. The audio module 780 may process sound information inputted or outputted through a speaker 782, a receiver 784, an earphone 786, or a microphone 788.

The camera module 791 is a device capable of obtaining still images and moving images. According to an embodiment of the present disclosure, the camera module 791 may include at least one image sensor (e.g., a front sensor or a rear sensor), a lens (not shown), an image signal processor (ISP), not shown), or a flash (e.g., LED or xenon lamp, not shown).

The power management module 795 may manage electric power of the electronic device 701. Although not shown, the power management module 795 may include, for example, a power management IC (PMIC), a charger IC, or a battery or fuel gauge. The PMIC may be formed, for example, of an IC chip or SoC. Charging may be performed in a wired or wireless manner. The charger IC may charge a battery 796 and prevent overvoltage or overcurrent from a charger. According to an embodiment of the present disclosure, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier. The battery gauge may measure the residual amount of the battery 796 and a voltage, current or temperature in a charging process. The battery 796 may store or create electric power therein and supply electric power to the electronic device 701. The battery 796 may be, for example, a rechargeable battery or a solar battery.

The indicator 797 may show thereon a current status (e.g., a booting status, a message status, or a recharging status) of the electronic device 701 or of its part (e.g., the AP 710). The motor 798 may convert an electric signal into a mechanical vibration. Although not shown, the electronic device 701 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

According to various embodiments of the present disclosure, at least a part of the connection control module 201 may be implemented in software, firmware, hardware, or a combination of two or more thereof. At least some of the connection control module 201 may be implemented (e.g., executed) by, for example, the processor (e.g., the AP 710). At least some of the connection control module 201 may include, for example, a module, a program, a routine, a set of instructions, and/or a process for performing one or more functions.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

According to various embodiments of the present disclosure, at least part of a device (e.g., modules or functions thereof) or a method (e.g., operations) according to the present disclosure be implemented, for example, by an instruction stored in a computer-readable storage media in a form of a programming module. When the instruction is executed by at least one processor (e.g., the processor 120), the at least one processor may perform a function corresponding to the instruction. The computer readable storage media may be, for example, the memory 130.

The computer-readable storage media may include Magnetic Media such as hard disk, floppy disk, or magnetic tape, optical media such as compact disc ROM (CD-ROM) or DVD, magneto-optical media such as floptical disk, and a hardware device such as ROM, RAM, or flash memory for storing and executing program commands (e.g., a programming module). Further, the program command may include a machine language code created by a compiler and a high-level language code executable by a computer using an interpreter. The foregoing hardware device may be configured to be operated according to at least one software module to perform an operation of the present disclosure, or software modules may be configured to be operated according to the hardware device.

The programming module according to the present disclosure may include at least one of the aforementioned elements, or may omit a part of the aforementioned elements, or may further include additional different elements. The operations performed by the programming module according to the present disclosure or other elements may be executed by a sequential, a parallel, an iterative, or a heuristics method. In addition, some operations may be executed in a different order, or may be omitted, or may add other operations.

While the present disclosure has been shown and described with reference to various embodiments thereof, it will be understood by those skilled in the art that various changes in form and details may be therein without departing from the spirit and scope of the present disclosure as defined by the appended claims and their equivalents.

What is claimed is:

1. A method comprising:
    establishing, by a first electronic device, a first connection with a second electronic device detachably connected to the first electronic device via a first communication channel when the second electronic device is attached to the first electronic device;
    providing, by the first electronic device, first content associated with an application that is executed in the second electronic device via the first communication channel;
    establishing, by the first electronic device, a second connection with the second electronic device via a second communication channel in response to detecting a designated event;
    providing, by the first electronic device, the first content, or second content associated with the application via the second communication channel; and
    detecting, by the first electronic device, whether the first electronic device is detached from the second electronic device,
    wherein the detecting of the designated event comprises detecting that a user's grip on at least one of the first electronic device or the second electronic device satisfies a specified condition, and
    wherein the user's grip is detected by a user's touch input through a touch sensor.

2. The method of claim 1, further comprising:
    identifying whether a specified time passes from a time point when the designated event is detected.

3. The method of claim 1, further comprising:
acquiring where and when a user touches the first or second electronic device, from a touch event detected through the touch sensor.

4. The method of claim 1,
wherein a plurality of first contact points of the first electronic device contact a plurality of second contact points of the second electronic device, and
wherein the designated event is detected when at least one of the plurality of first contact points is separated from a second contact point.

5. The method of claim 1, further comprising:
changing at least one processor corresponding to the first content or the application among a plurality of processors of the first electronic device from a deactivated state to an activated state.

6. The method of claim 1, wherein the providing of the first or second content comprises:
executing, by the first electronic device, another application associated with the application; and
providing the first or second content through the other application.

7. The method of claim 1, wherein the second content comprises a same content as the first content.

8. The method of claim 1, further comprising:
stopping the providing of the first or second content when a distance between the first and second electronic devices exceeds a specified range.

9. A first electronic device comprising:
a communication module;
a connector detachably connected to a second electronic device; and
at least one processor configured to execute one or more modules,
wherein the one or modules comprise:
a determination module configured to:
establish a first connection with the second electronic device via a first communication channel using the connector when the second electronic device is attached to the first electronic device,
establish a second connection with the second electronic device via a second communication channel using the communication module in response to detecting a designated event, and
detect whether the first electronic device is detached from the second electronic device, and
a provision module configured to:
provide first content associated with an application that is executed in the second electronic device via the first communication channel, and
provide the first content or second content associated with the application via the second communication channel,
wherein the detecting of the designated event comprises detecting that a user's grip on at least one of the first electronic device or the second electronic device satisfies a specified condition, and
wherein the user's grip is detected by a user's touch input through a touch sensor.

10. The first electronic device of claim 9, wherein the determination module is further configured to identify a specified time passes from a time point when the designated event is detected.

11. The first electronic device of claim 9, wherein the determination module is further configured to acquire where and when a user touches the first or second electronic device, from a touch event detected through the touch sensor.

12. The first electronic device of claim 9,
wherein the first and second electronic devices are connected to each other through a plurality of first contact points of the first electronic device and a plurality of second contact points of the second electronic device, and
wherein the designated event is detected when at least one of the plurality of first contact points is separated from a second contact point.

13. The first electronic device of claim 9, wherein the one or more modules further comprises a change module configured to change the at least one processor from a deactivated state to an activated state.

14. The first electronic device of claim 13,
wherein the at least one processor comprises a first processor and a second processor, and
wherein the provision module is further configured to provide the first content through the first processor before the determination of the change in the connection and to provide the first content or second content through the second processor based on the determination of the change in the connection.

15. The first electronic device of claim 9, wherein the one or more modules further comprises a change module configured to activate a wireless power transmission/reception function of the first electronic device or another electronic device based on the determination of the change in the connection.

16. The first electronic device of claim 9, wherein the provision module is further configured to execute another application in the second electronic device based on the determination of the change in the connection and to provide the first content or the second content through the other application.

17. The first electronic device of claim 9, wherein the provision module is further configured to stop the providing of the first content or the second content when a distance between the first electronic device and the second electronic device exceeds a specified range.

18. A non-transitory storage medium having instructions stored therein, wherein the instructions are set to make at least one processor perform at least one operation when the instructions are executed by the at least one processor, and the at least one operation comprises:
establishing, by a first electronic device, a first connection with a second electronic device detachably connected to the first electronic device via a first communication channel when the second electronic device is attached to the first electronic device;
providing, by the first electronic device, first content associated with an application that is executed in the second electronic device via the first communication channel;
establishing, by the first electronic device, a second connection with the second electronic device via a second communication channel in response to detecting a designated event;
providing, by the first electronic device, the first content, or second content associated with the application via the second communication channel; and
detecting, by the first electronic device, whether the first electronic device is detached from the second electronic device,
wherein the detecting of the designated event comprises detecting that a user's grip on at least one of the first electronic device or the second electronic device satisfies a specified condition, and wherein the user's grip is detected by a user's touch input through a touch sensor.

\* \* \* \* \*